United States Patent [19]

Lange et al.

[11] 4,099,979

[45] Jul. 11, 1978

[54] $Si_3N_4$ HOT-PRESSED WITH MgO

[75] Inventors: Frederick F. Lange, Thousand Oaks, Calif.; Clarence A. Andersson, Pittsburgh, Pa.

[73] Assignee: Westinghouse Electric Corp., Pittsburgh, Pa.

[21] Appl. No.: 755,384

[22] Filed: Dec. 29, 1976

[51] Int. Cl.$^2$ .................. C04B 33/32; C04B 35/58
[52] U.S. Cl. .................................. 106/58; 106/63; 106/69; 106/73.5
[58] Field of Search ........................... 106/73.5, 58

[56] References Cited

U.S. PATENT DOCUMENTS

| | | | |
|---|---|---|---|
| 3,811,928 | 5/1974 | Henney et al. | 106/69 |
| 3,836,374 | 9/1974 | Richerson | 106/73.5 |
| 3,992,497 | 11/1976 | Terwilliger et al. | 106/73.5 |
| 4,025,351 | 5/1977 | Masaki | 106/73.5 |

OTHER PUBLICATIONS

Terwilliger, G.R. et al., "Hot-Pressing Behavior of $Si_3N_4$" J. Am. Cer. Soc. 57(1), Jan. 1974, pp. 25-29.

Mitomo, M. et al., "Sintering of $Si_3N_4$"-Cer. Soc. Bull., 55 (3) 1976, p. 313.

Mazdiyasni, K. S. et al., "Synthesis, Characterization and Consolidation of $Si_3N_4$ Obtained from Ammonolysis of $SiCl_4$," J. Am. Cer. Soc., 56 (12), Dec. 1973, pp. 628-633.

Colquhoun, I. et al., "The Determination of Surface Silica and Its Effect on the Hot-Pressing Behavior of Alpha-Silicon Nitride Powder," Proc. of Brit. Cer. Soc., No. 22 (1973), pp. 181-195.

Crandall, W. B. et al., "Preparation and Evaluation of Si-Al-O-N," IIT Research Inst.-Prep. for Aerospace Res. Labs., Jun. 1973, pp. 8-10.

Weston, R. J. et al., "Kinetics of Hot-Pressing of Alpha-Silicon Nitride Powder with Additives," Proc. Brit. Cer. Soc., No. 22 (1973), pp. 197-206.

Primary Examiner—Helen M. McCarthy
Attorney, Agent, or Firm—R. A. Stoltz

[57] ABSTRACT

This invention relates generally to ceramic materials formed from powder, and more particularly to hot-pressed structural materials comprising silicon nitride ($Si_3N_4$) wherein the oxygen content is controlled by maintaining the molar ratio of MgO and $SiO_2$.

3 Claims, 5 Drawing Figures

4,099,979

$Si_3N_4$ HOT-PRESSED WITH MgO

This invention described herein was made in the course or under a contract or subcontract thereunder with the advanced products agency, Office of Naval Research, Contract No. N00014-74-C-0284.

FIELD OF THE INVENTION

Description of the Prior Art

Heretofore it has been known in the art to hotpress $Si_3N_4$ powder with the addition of small amounts of magnesium oxide (MgO) as a densification aid. See for example British Pat. Nos. 1,092,637 and 1,273,145. The MgO reacts with the silicon oxide ($SiO_2$) surface layer on each $Si_3N_4$ particle to form a liquid at high temperatures which aids in densifying the $Si_3N_4$ particles by a solution precipitation mechanism. Upon cooling, the resultant densified mass consists of $Si_3N_4$ grains and a residual grain boundary phase. The addition of MgO therefore provides higher densities in the silicon nitride body than for the case where no MgO is employed. While this MgO addition is beneficial from the densification standpoint, we have determined that the residual grain boundary phase including MgO and $SiO_2$ can become viscous at high temperatures allowing the $Si_3N_4$ grains to separate and slide under stress thus causing a degradation of the material's mechanical properties.

SUMMARY OF THE INVENTION

In accordance with our invention high purity $Si_3N_4$ powder is used as a starting material and the $MgO/SiO_2$ molar ratio is controlled between 3 and 5 and the MgO content is controlled at less than 6% by weight. The hot-pressed, densified silicon nitride material of our invention provides a two-fold increase in strength at 1400° C relative to commercial grade hot-pressed $Si_3N_4$ and about 3 to 4 orders of magnitude decrease in creep strain rate behavior at elevated temperatures relative to the commercial grade material.

BRIEF DESCRIPTION OF THE DRAWINGS

In order to gain a better understanding of our invention reference is made to the drawings in which.

DESCRIPTION OF THE PREFERRED EMBODIMENT

As noted above, the grain boundary phase can become viscous at high temperatures allowing the $Si_3N_4$ grains to separate and slide under stress, causing a degradation of the material's mechanical properties. The temperature where the grain boundary phase becomes viscous and affects the mechanical properties is determined by its chemical composition. We have determined that certain impurities such as CaO that reside within the grain boundary phase lower the temperature where the degradation is first observed.

Accordingly, the CaO content must be limited to about 200 ppm maximum. In accordance with our observations, we have determined that the high temperature mechanical properties of $Si_3N_4$ may be enhanced by fabricating a purer starting material. Hence, by utilizing a pure starting material the detrimental effects of the impurities on the grain boundary phase viscosity are minimized. The problem of grain boundary viscosity at high temperatures and under stress is still present, however, notwithstanding the fact that purer starting materials are utilized. This problem we discovered is related to the MgO content of the powder, and further, the $MgO/SiO_2$ molar ratio.

High purity $Si_3N_4$ powder was produced by nitriding Si powder with additions of 0.0, 1.0 and 3.0 wt.% $SiO_2$. The phase content of the resulting powders was 83–93% α-$Si_3N_4$; 17–7% β-$Si_3N_4$ and ≦ 1% Si as determined by X-ray diffraction analysis. The oxygen content of the representative powders was determined after nitriding by the inert gas fusion, thermoconductivity method. Table 1 below reports the impurity content of the $Si_3N_4$ powders produced.

TABLE 1

| Spectrochemical Analyses of Westinghouse $Si_3N_4$ Starting powder (wt. %) | |
|---|---|
| Al | 0.08 |
| Ag | 0.001 |
| B | 0.001 |
| Ca | 0.016 |
| Cr | 0.01 |
| Fe | 0.1 |
| Mg | 0.001 |
| Mn | 0.05 |
| Mo | 0.003 |
| Ni | 0.01 |
| Pb | 0.01 |
| Sb | 0.01 |
| Sn | 0.01 |
| Ti | 0.01 |
| V | 0.005 |
| Zn | 0.01 |

Figure 1:
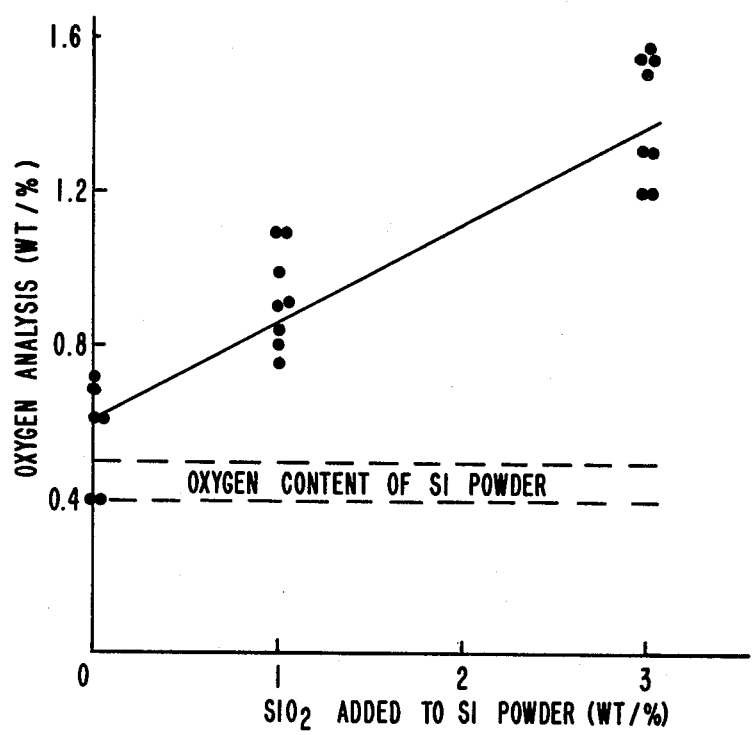
FIG. 1 is a graphical representation of the oxygen content of the powder wherein varying amounts of $SiO_2$ have been added.

FIG. 1 graphically illustrates that the oxygen content for the different batches of $Si_3N_4$ powder produced is a function of the $SiO_2$ added prior to nitriding. The oxygen content of the silicon powder nitrided was between 0.4 and 0.5 wt.%. It is reasonable to believe that the oxygen content of the Si powder is due to a surface layer of $SiO_2$ and therefore, as noted in FIG. 1, the increase in oxygen content is proportional to the $SiO_2$ added prior to nitriding. The molar content of the $SiO_2$ in the powder is ranged between 1.7 and 6.7 mole percent.

$Si_3N_4$ powders containing different $MgO/SiO_2$ ratios were prepared by mixing between 2 and 8% by weight MgO with the $Si_3N_4$ powders containing different $SiO_2$ content. In addition, the $MgO/SiO_2$ ratios of several powders were also varied by mixing both MgO and $SiO_2$ into a powder with an oxygen content of 0.4 wt.% (equivalent to 0.75 wt.% $SiO_2$). Mixing and particle size reduction was performed by milling the powder with methanol in polyethylene bottles using tungsten carbide cylindrical grinding media. Oxygen analysis before and after milling showed no changes that could not be accounted for by the MgO addition.

After stir-drying, the milled composite powders were hot-pressed in a nitrogen atmosphere in graphite dies with a stress of 28 $MN/m^2$ at a temperature of 1750° C between 1–4 hours to produce 5 cm diameter by 0.75 cm discs. Graphite dies with appropriate coatings were used in accordance with standard hot-pressing techniques. Densities were determined by water immersion. The densities of the hot-pressed composite silicon nitride particles were between 3.20 grams per cc and 3.29 grams per cc. Bar specimens 0.317 × 0.635 × 3.17 cm were sectioned and ground. Room temperature flexural strength measurements were made at a crosshead speed of 0.05 cm/min using a metal fixture (0.635 cm inner and 1.905 cm outer loading spans). Elevated temperature measurements were performed in air at 1400° C with a crosshead speed of 0.005 cm/min using a hot-pressed $Si_3N_4$ fixture (0.950 cm inner and 2.222 cm outer loading spans).

Figure 2:
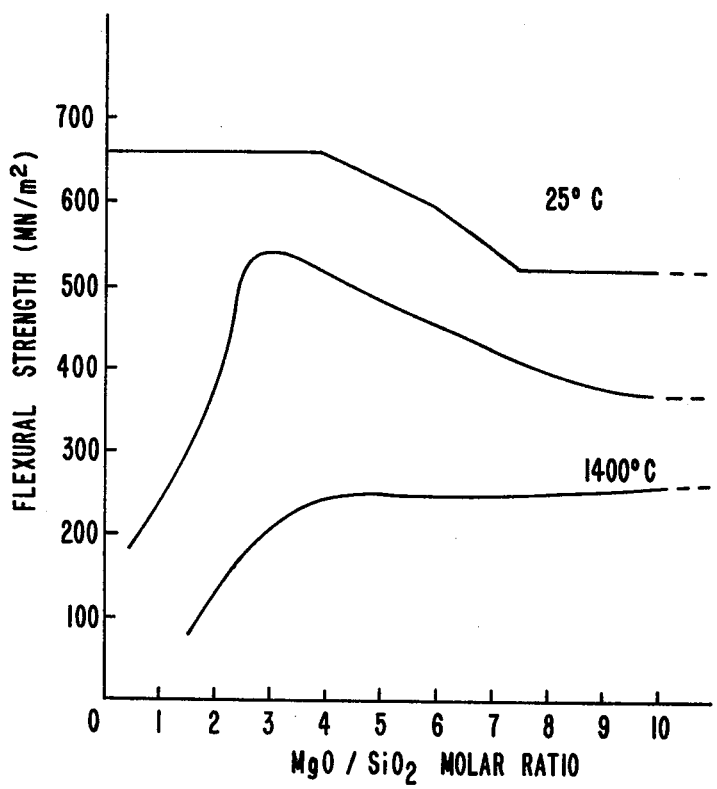
FIG. 2 is a graphical representation of the variation in flexural strength as a function of the $MgO/SiO_2$ molar ratio.

FIG. 2 is a graphical representation of the flexural strength data at room temperature and at 1400° C as a function of the $MgO/SiO_2$ ratio. The oxygen content of the $Si_3N_4$ powder was used to calculate the $SiO_2$ content and thus the $MgO/SiO_2$ molar ratio. At 1400° C the mean strength increased from 170 $MN/M^2$ at low $MgO/SiO_2$ ratios to 415 $MN/M^2$ at an $MgO/SiO_2$ ratio equal to 3. Thereafter, the flexural strength decreased to 345 $MN/M^2$ at higher $MgO/SiO_2$ ratios of about 9. FIG. 2 indicates that where the $MgO/SiO_2$ ratio was lowered by these additions of $SiO_2$ to ratios of 1 and 2 produced low elevated temperature strength materials were produced. Without the additional $SiO_2$ the same $Si_3N_4$ powders had greater $MgO/SiO_2$ ratios and correspondingly higher strengths at 1400° C.

Figure 3:
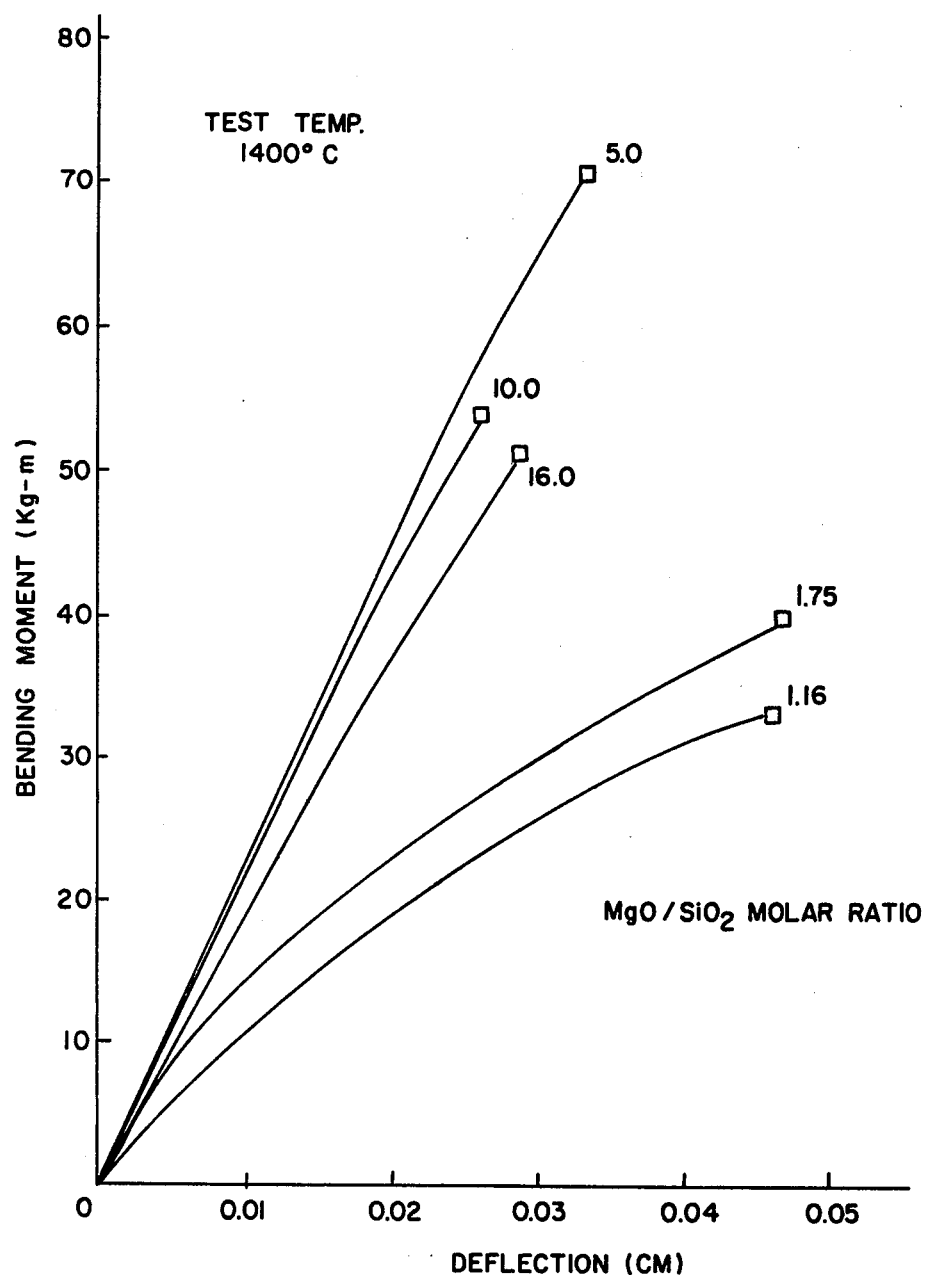
FIG. 3 is a graphical representation of the load-deflection behavior of various materials with differing MgO contents and $MgO/SiO_2$ molar ratios.

Referring now to FIG. 3, the load-deflection curve for selected specimens with different $MgO/SiO_2$ ratios are depicted. As can be noted in FIG. 3, less non-elastic deformation occurs at $MgO/SiO_2$ ratios greater than 3.

The flexural strength of commercial hot-pressed $Si_3N_4$ is about 25,000–35,000 psi at 1400° C compared to between 45,000 and 70,000 psi for the material of our invention with an $MgO/SiO_2$ molar ratio of between 3 and 4. It is noted therefore that the material of our invention provides about a two-fold increase in flexural strength at 1400° C relative to the commercial $Si_3N_4$. Room temperature strengths are similar for both materials.

Figure 4:
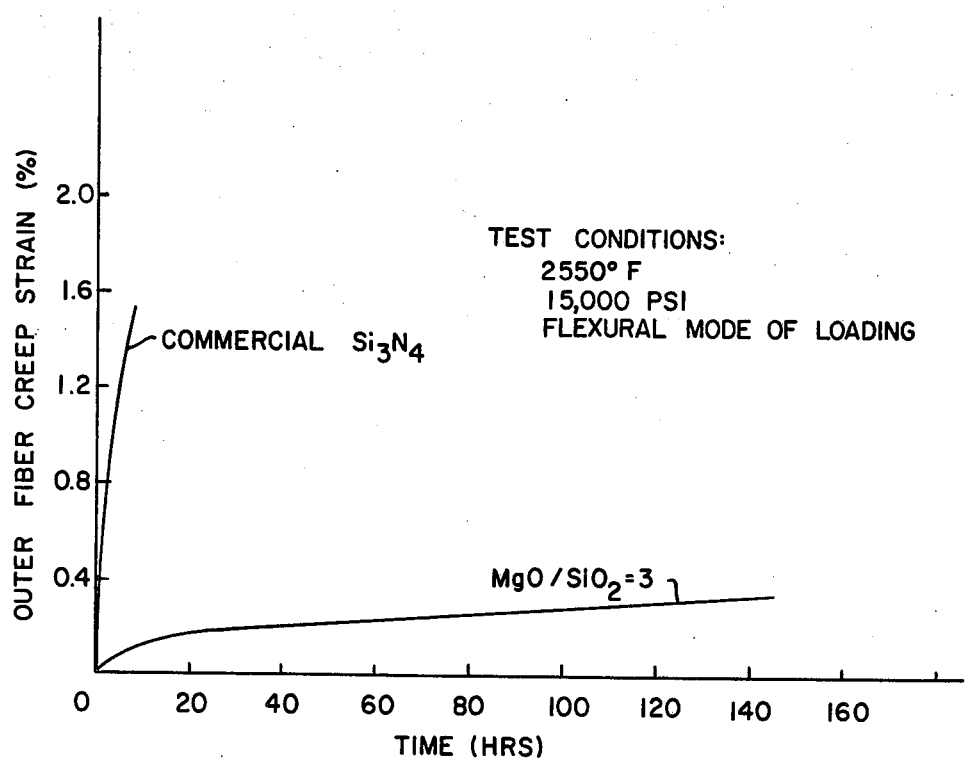
FIG. 4 is a graphical representation comparing the creep behavior of the materials of our invention versus commercial grade silicon nitride.
Figure 5:
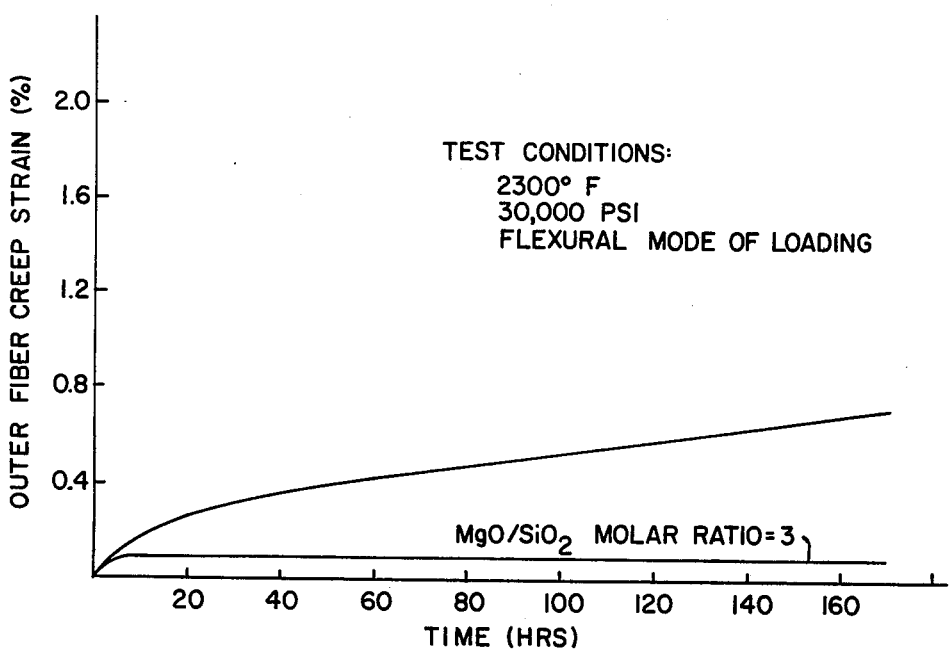
FIG. 5 is a graph similar to that of FIG. 4.

In addition to the improved flexural strength of our materials, they also exhibit enhanced resistance to creep at elevated temperature. The creep behavior of the materials of our invention and that of the commercial $Si_3N_4$ material is illustrated in FIG. 4 at 2550° F and in FIG. 5 at 2300° F. The material tested in FIG. 4 was under a stress of 15,000 psi while the material of FIG. 5 was under a stress of 30,000 psi. As shown in the drawings, the creep resistance of the materials of this invention with an $MgO/SiO_2$ ratio of 3 is approximately 3 to 4 orders of magnitude better than the commercial $Si_3N_4$ material tested.

By maintaining the $MgO/SiO_2$ molar ratio between 3–5 and more preferably between 3 and 4 and by maintaining the MgO content below 6 wt.% the mechanical property degradation of the material is increased by about 350° F relative to the commercial grade $Si_3N_4$ materials. This increase in operating temperature is significant for high temperature structural materials such as those employed in gas turbine applications. The materials of this invention therefore are particularly suited for such components, for example, turbine blades and vanes.

We claim:

1. A structural material suitable for use at elevated temperatures consisting essentially of silicon nitride, silicon dioxide and magnesium oxide, the molar ratio of MgO to $SiO_2$ being within the range between about 3 and about 5, the MgO content not exceeding 6% by weight and the CaO content not exceeding 200 ppm, and the silicon nitride phases are between 83 and 93% alpha phase and between 7 and 17% beta phase and silicon is $\leq 1\%$.

2. Hot pressed reaction sintered silicon nitride suitable for use at elevated temperatures consisting essentially of MgO, $SiO_2$, Si, CaO and $Si_3N_4$ with the MgO content not exceeding 6% by weight, the molar ratio of MgO to $SiO_2$ being within the range between about 3 and about 5, a silicon content $\leq 1\%$ and the balance silicon nitride, said sintered nitride having a CaO content not exceeding 200 ppm, and the silicon nitride phases are between 83 and 93% alpha phase and between 7 and 17% beta phase.

3. The composition of claim 2 in which the MgO to $SiO_2$ ratio is within the range between about 3 and about 4.

* * * * *